United States Patent
Dong et al.

(10) Patent No.: US 10,679,143 B2
(45) Date of Patent: Jun. 9, 2020

(54) MULTI-LAYER INFORMATION FUSING FOR PREDICTION

(71) Applicant: INTERNATIONAL BUSINESS MACHINES CORPORATION, Armonk, NY (US)

(72) Inventors: Wei Shan Dong, Beijing (CN); Peng Gao, Beijing (CN); Chang Sheng Li, Beijing (CN); Chun Yang Ma, Beijing (CN); Junchi Yan, Shanghai (CN); Ren Jie Yao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 886 days.

(21) Appl. No.: 15/200,509

(22) Filed: Jul. 1, 2016

(65) Prior Publication Data
US 2018/0005130 A1 Jan. 4, 2018

(51) Int. Cl.
*G06N 20/00* (2019.01)

(52) U.S. Cl.
CPC .................. *G06N 20/00* (2019.01)

(58) Field of Classification Search
CPC ...... G06N 20/00; G06N 7/005; G06N 99/005; G06K 2009/6871
USPC ............................................ 705/12; 706/12
See application file for complete search history.

(56) References Cited

U.S. PATENT DOCUMENTS

| | | | | |
|---|---|---|---|---|
| 8,706,656 B1 * | 4/2014 | Lin | ........................ | G06N 20/00 706/12 |
| 2006/0224538 A1 * | 10/2006 | Forman | .................. | G06N 20/00 706/20 |
| 2008/0027887 A1 | 1/2008 | Barbu et al. | | |
| 2009/0182696 A1 * | 7/2009 | Menahem | ............ | G06K 9/6292 706/20 |
| 2011/0302111 A1 * | 12/2011 | Chidlovskii | ........... | G06N 20/00 706/12 |
| 2014/0114885 A1 * | 4/2014 | Han | ..................... | G06N 3/0454 706/12 |
| 2014/0236872 A1 | 8/2014 | Keshava et al. | | |

(Continued)

FOREIGN PATENT DOCUMENTS

| | | |
|---|---|---|
| WO | 2008127465 | 10/2008 |

OTHER PUBLICATIONS

Giacinto et al., "Fusion of multiple classifiers for intrusion detection in computer networks", Pattern Recognition Letters 24 (2003) 1795-1803. (Year: 2003).*

(Continued)

*Primary Examiner* — Dave Misir
(74) *Attorney, Agent, or Firm* — F. Chau & Associates, LLC

(57) ABSTRACT

A method of generating a predictor to classify data includes: training each of a plurality of first classifiers arranged in a first level on current training data; operating each classifier of the first level on the training data to generate a plurality of predictions; combining the current training data with the predictions to generated new training data; and training each of a plurality of second classifiers arranged in a second level on the new training data. The first classifiers are classifiers of different classifier types, respectively and the second classifiers are classifiers of the different classifier types, respectively.

24 Claims, 8 Drawing Sheets

(56) References Cited

U.S. PATENT DOCUMENTS

2015/0154353 A1* 6/2015 Xiang .................. G16B 40/00
706/12
2016/0253466 A1* 9/2016 Agaian ................ G06N 3/0427
382/128

OTHER PUBLICATIONS

Schels et al., "Multi-Modal Classifier-Fusion for the Recognition of Emotions", 2013. (Year: 2013).*
Utthara Gosa Mangai, et al., "A Survey of Decision Fusion and Feature Fusion Strategies for Pattern Classification", IETE Technical Review (Impact Factor: 0.89), Jul. 2010, 27(4). DOI:10.4103/0256-4602.64604.
Manhua Liu, et al., "Hierarchical Fusion of Features and Classifier Decisions for Alzheimer's Disease Diagnosis", Published in final edited form as: Hum Brain Mapp. Apr. 2014; 35(4): 1305-1319.
Wenzhi Liao et al., "Combining Feature Fusion and Decision Fusion for Classification of Hyperspectral and Lidar Data", Geoscience and Remote Sensing Symposium (IGARSS), 2014 IEEE International Date of Conference: Jul. 13-18, 2014.
Adam Coates et al., "Learning Feature Representations With K-Means", 2012 URL: http://www.cs.stanford.edu/~acoates/papers/coatesng_nntot2012.pdf.

* cited by examiner

MULTI-LAYER INFORMATION FUSING FOR PREDICTION

BACKGROUND

1. Technical Field

The present disclosure relates generally to machine learning and prediction using classifiers, and more particularly to fusion of different classifiers to provide improved predictions.

2. Discussion of Related Art

Machine learning is a subfield of computer science that evolved from the study of pattern recognition and computational learning theory. Machine learning explores the study and construction of algorithms that can learn from and make predictions on data. Such algorithms operate by building a model from an example training set of input observations in order to make data-driven predictions or decisions expressed as outputs.

Supervised learning is the machine learning task of inferring a function from labeled training. The training data consist of a set of training examples. In supervised learning, each example is a pair consisting of an input object (typically a vector) and a desired output value. A supervised learning algorithm analyzes the training data and produces an inferred function (e.g., a classifier), which can be used for mapping new examples. An optimal scenario will allow for the classifier to correctly determine the class labels for unseen instances.

There are various different types of classifiers. However, it can be difficult to fuse the outputs of different types of classifiers.

BRIEF SUMMARY

According to an exemplary embodiment of the inventive concept, a method is provided to generate a predictor to classify data. The method includes: training each of a plurality of first classifiers arranged in a first level on current training data; operating each classifier of the first level on the training data to generate a plurality of predictions; combining the current training data with the predictions to generated new training data; and training each of a plurality of second classifiers arranged in a second level on the new training data. The first classifiers are classifiers of different classifier types, respectively and the second classifiers are classifiers of the different classifier types, respectively.

According to an exemplary embodiment of the inventive concept, a computer system is configured to generate a predictor to classify data. The system includes: a memory storing a computer program; and a processor configured to execute the computer program. The computer program is configured to train each of a plurality of first classifiers arranged in a first level on current training data, operate each classifier of the first level on the training data to generate a plurality of predictions, combine the current training data with the predictions to generated new training data, and train each of a plurality of second classifiers arranged in a second level on the new training data. The first classifiers are classifiers of different classifier types, respectively and the second classifiers are classifiers of the different classifier types, respectively.

According to an exemplary embodiment of the inventive concept, a computer program product is configured to generate a predictor to classify data. The program product includes a computer readable storage medium having program instructions embodied therewith. The program instructions are executable by a computer to perform a method including: training each of a plurality of first classifiers arranged in a first level on current training data; operating each classifier of the first level on the training data to generate a plurality of predictions; combining the current training data with the predictions to generated new training data; and training each of a plurality of second classifiers arranged in a second level on the new training data. The first classifiers are classifiers of different classifier types, respectively and the second classifiers are classifiers of the different classifier types, respectively.

According to an exemplary embodiment of the invention, a method is provided to generate a predictor to classify data. The method includes: splitting current training data into first and second training data; training each of a plurality of first classifiers arranged in a first level on the first training data; operating each classifier of the first level on the second training data to generate first fused data; training each classifier of the first level on the second training data; operating each classifier of the first level on the first training data to generate second fused data; combining the first fused data with the second fused data to generate new training data; and training each of a plurality of second classifiers arranged in a second level on the new training data. The first classifiers are classifiers of different classifier types, respectively and the second classifiers are classifiers of the different classifier types, respectively.

According to an exemplary embodiment of the inventive concept, a computer program product is configured to generate a predictor to classify data. The program product includes a computer readable storage medium having program instructions embodied therewith. The program instructions are executable by a computer to perform a method including: splitting current training data into first and second training data; training each of a plurality of first classifiers arranged in a first level on the first training data; operating each classifier of the first level on the second training data to generate first fused data; training each classifier of the first level on the second training data; operating each classifier of the first level on the first training data to generate second fused data; combining the first fused data with the second fused data to generate new training data; and training each of a plurality of second classifiers arranged in a second level on the new training data. The first classifiers are classifiers of different classifier types, respectively and the second classifiers are classifiers of the different classifier types, respectively.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Figure 1:
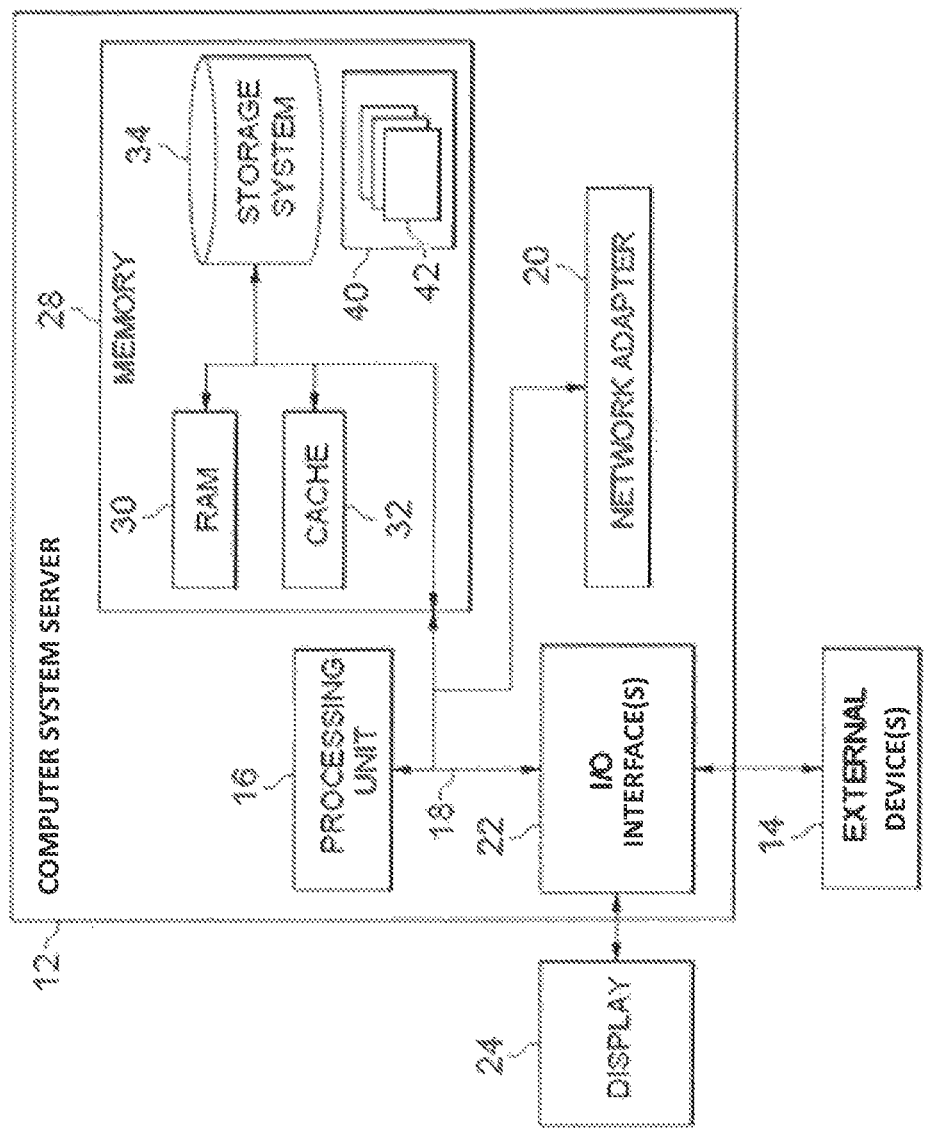
FIG. 1 shows an exemplary computer system which may be used to implement embodiments of the invention.

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

FIG. 1 illustrates a computer system/server that may be used to implement embodiments of the invention. The computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 2:
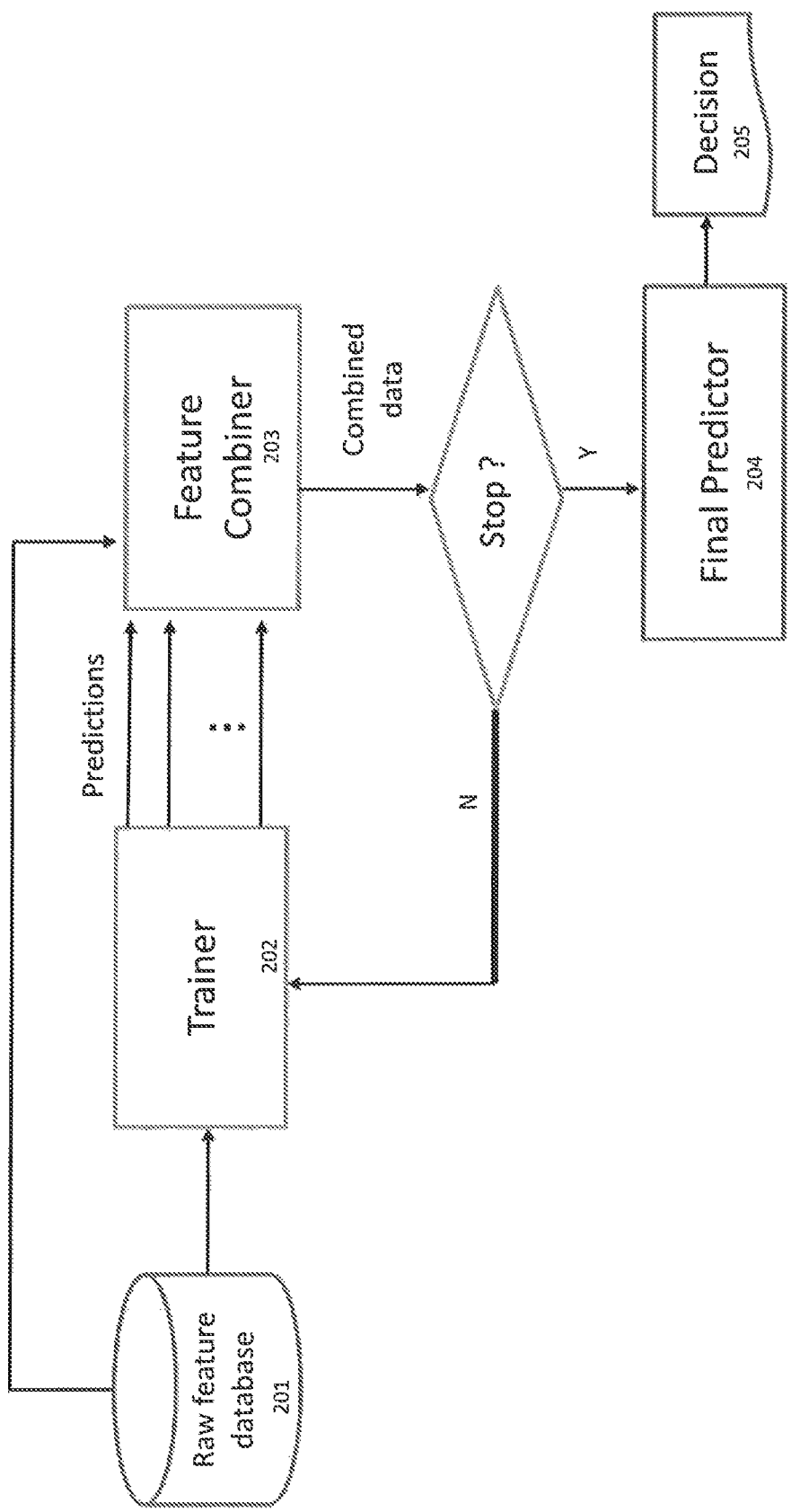
FIG. 2 shows a system that may be employed on the computer according to an exemplary embodiment of the inventive concept.

FIG. 2 illustrates a system according to an exemplary embodiment of the invention that may be implemented on server 12 of FIG. 1. Referring to FIG. 2, the system includes a raw feature database 201, a trainer unit 202, a feature combiner 203, and a final predictor 204. The raw feature database 201 may include training data. The training data may include several samples, where each sample includes a vector comprising one or more features and a label or a value indicating how the sample is to be classified. For example, if the samples will be used to train a classifier to detect whether or not an image includes a particular object, the label or value indicates the sample is to be classified as including the particular object or as classified as excluding the particular object. The raw feature database 201 may be a relational database as an example.

The trainer unit 202 is configured to train a group of different classifiers of different types on training data provided from database 201 and operate the classifiers on the training data to output predictions. The trainer unit 202 may be implemented by a computer program resident in memory 24 or on firmware of the server 12. The different types of classifiers may include a support vector machine classifier (SVM), a decision tree classifier, a neural network classifier, and a random forest classifier.

The feature combiner 203 fuses the training data received by the trainer unit 202 with the predictions output by the trainer 202 into combined training data. The feature combiner 203 may be implemented by a computer program resident in memory 24 or on firmware of the server 12. The system determines whether it should stop training. If the system determines that it will continue training, then the trainer 202 trains a new group of the different classifiers on the combined training data and operates the new group of classifiers on the combined training data to generate new predictions. The feature combiner 203 then fuses the new predictions with the combined training data to generate second combined training.

If the system determines that it will stop training at this point, then the Final Predictor 204 operates the new group of classifiers on the second combined data to generate a final decision 205. The feature combiner 203 may be implemented by a computer program resident in memory 24 or on firmware of the server 12.

Figure 3:
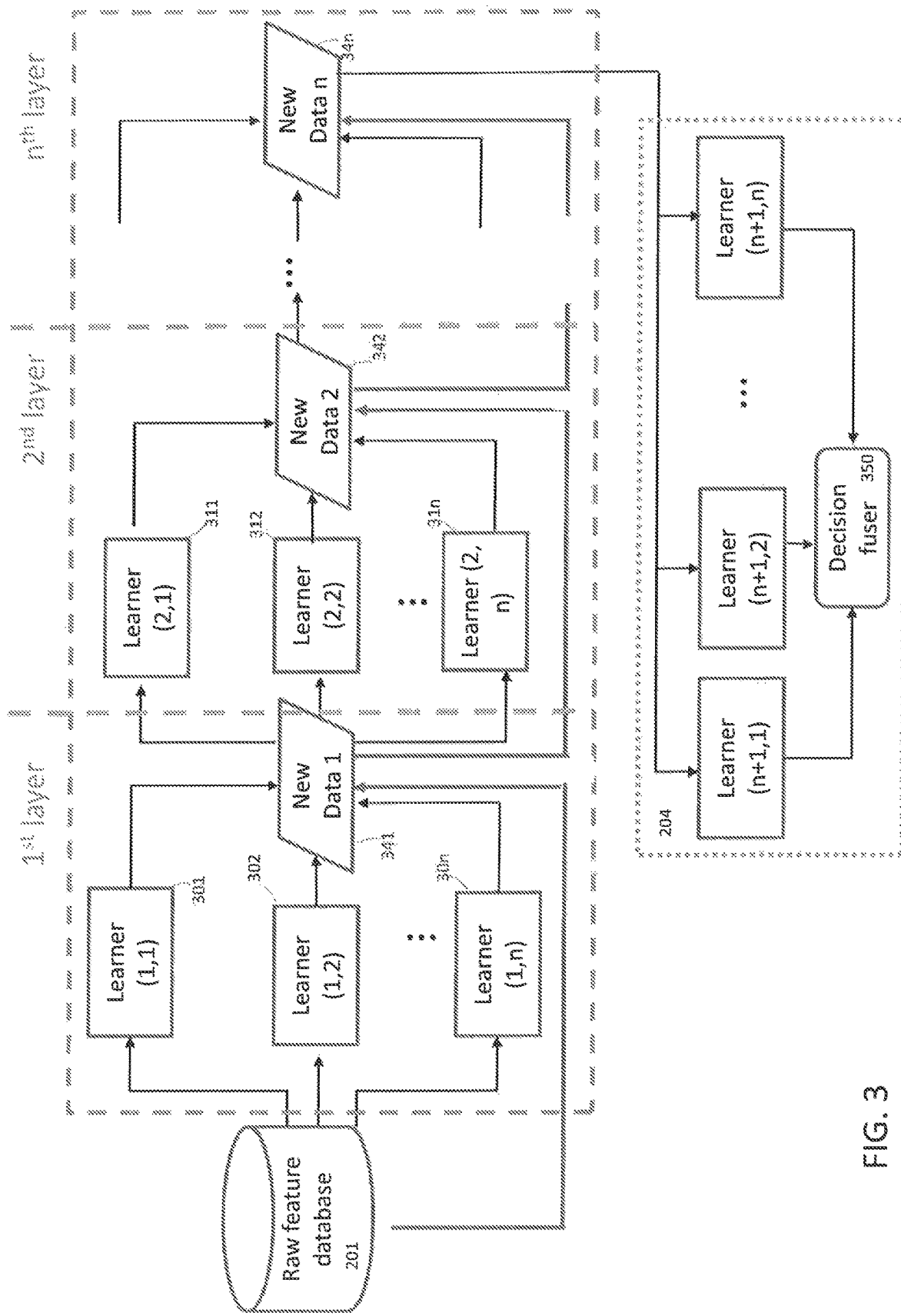
FIG. 3 illustrates an arrangement of classifiers according to an exemplary embodiment of the inventive concept.

FIG. 3 illustrates an arrangement to explain an operation of the system of FIG. 2. The arrangement includes n layers of classifiers and each layer includes n classifiers, where n is greater than 1. The $1^{st}$ layer includes classifiers 301, 302, . . . , 30n, the $2^{nd}$ layer includes classifiers 311, 312, . . . , 31n. Each classifier in a layer is of different classifying type. For example, the first classifier 301 could be a SVM classifier, the second classifier 302 could be a decision tree classifier, and the n-th classifier could be a neural network classifier. In an embodiment, the classifiers in each next layer are of the same type as those of the previous layer. For example, if the classifiers of the $1^{st}$ layer are SVM, decision tree, and neural network, respectively, then the first classifier 311 of the $2^{nd}$ layer would be an SVM classifier, the second classifier 312 of the $2^{nd}$ layer would be a decision tree classifier, and the third classifier 31n of the $3^{rd}$ layer would be a neural network classifier.

The $1^{st}$ layer generates first new training data 341 by combining predictions generated by each of the classifiers 301-30n of the $1^{st}$ layer with previous training data loaded from the database 201 that was previously used to train the classifiers. If the $2^{nd}$ layer is not the final layer, then the $2^{nd}$ layer generates second new training data 342 by combining predictions generated by each of the classifiers 311-31n of the $2^{nd}$ layer with the first new training data 341. This procedure continues until a desired number of layers are trained to generate n-th new training data 34n. The final predictor 204 then trains the last layer of classifiers using the n-th generated new training data 34n. When the trained last layer of classifiers is operated on new data, the predictions output from them can be combined (fused) by a decision fuser 350 to provide decision 205. The decision fuser 350 may be implemented by a computer program resident in memory 24 or on firmware of the server 12.

Figure 4:
FIG. 4 illustrates a method of generating a final trained layer of the classifiers according to an exemplary embodiment of the inventive concept.
Figure 5:
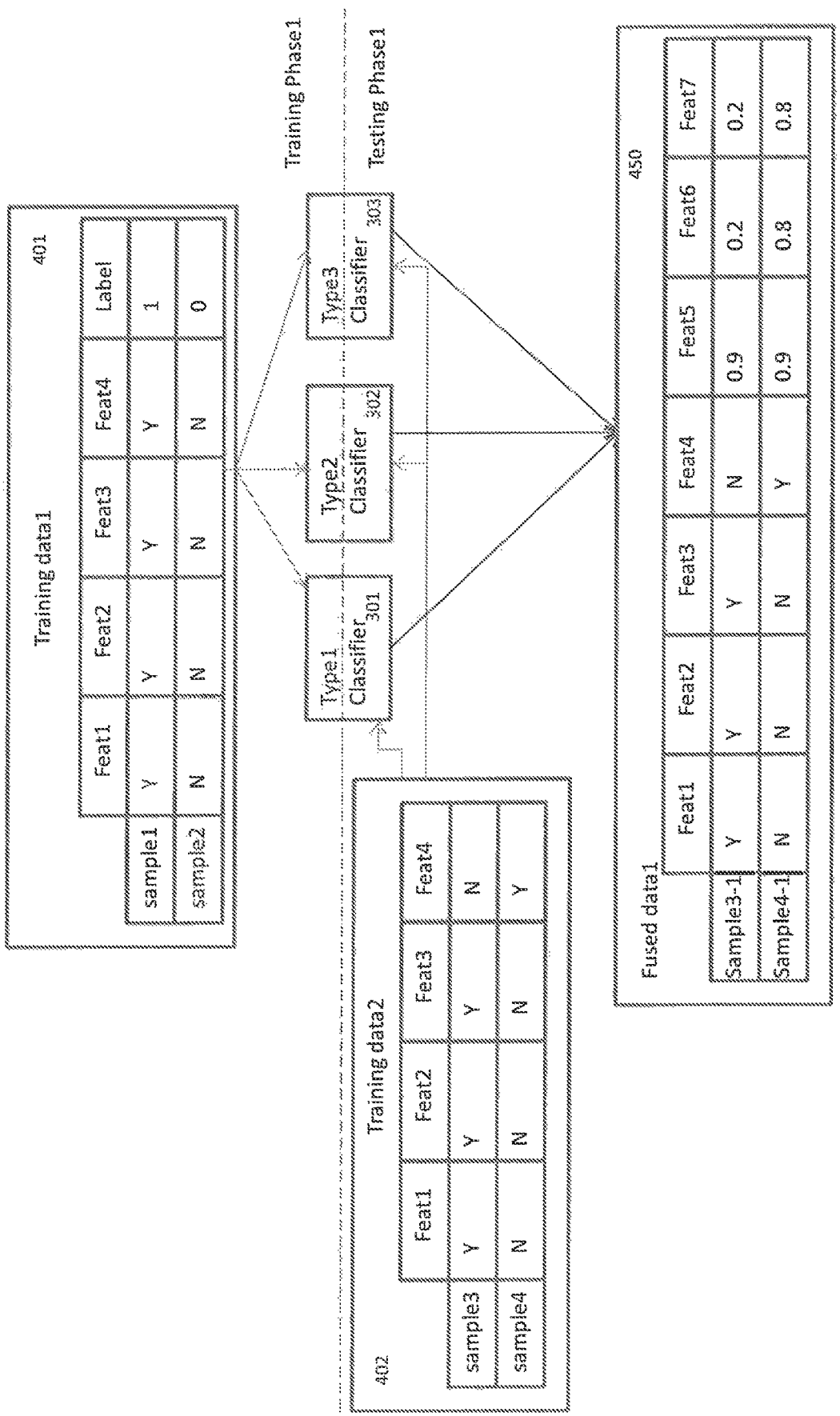
FIG. 5, FIG. 6, FIG. 7, and FIG. 8 are provided to illustrate the method of FIG. 4 being applied to example training data.
Figure 6:
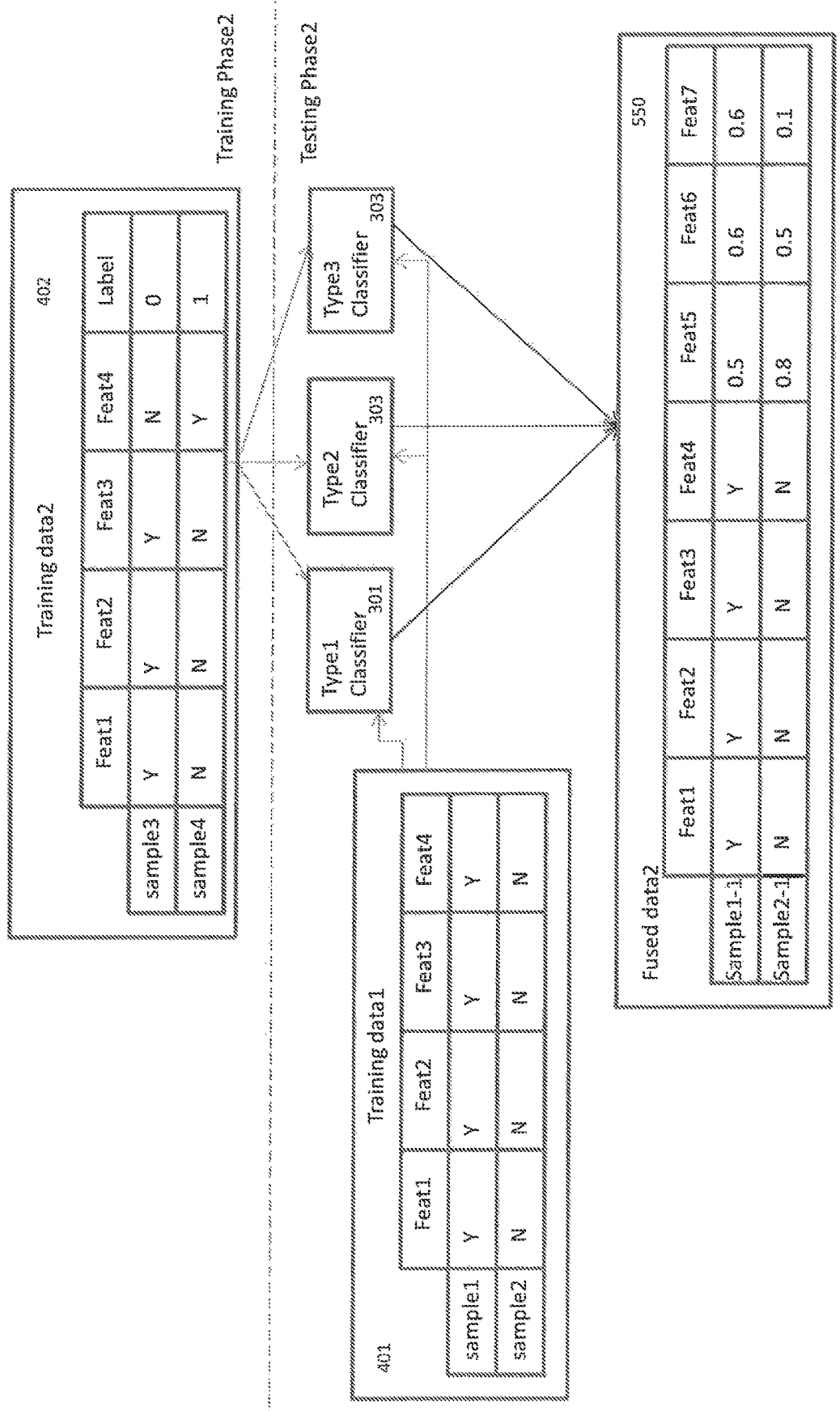

FIG. 4 illustrates a method of training a classifier according to an exemplary embodiment of the invention. The method includes splitting training data into first training data and second training data (S401). For example, FIG. 5 shows that 401 is an example of the first training data and FIG. 6 shows that 402 is an example of the second training data. In this example, the training data include four samples for ease of explaining embodiments of the invention. However, the invention is not limited thereto as the training data may have more than four samples (e.g., hundreds, thousands, etc.). Further, while the figures show that the training data is split into equal sets, the invention is not limited thereto. For example, the first training data could include more samples than the second training data or vice versa.

The method then includes training each classifier of a current level (or layer) on the first training data (S402). For example, FIG. 5 shows classifiers 301, 302, and 303 being trained on first training data 401 during a first training phase ("Training Phase 1"). In this example, each sample of the first training data 401 indicates whether each of four features (feature vector) is present or absent from the sample and a label indicating whether the feature vector is classified as being part of a given class or as not being part of the given class. For example, the first sample 'sample1' of the first training data 401 includes all four features and accordingly is classified as being part of the class, and the second sample 'sample2' of the first training data 401 does not include any of the four features and accordingly is classified as not being part of the class. For example, if the class is a bird, and the samples are images, then the first sample would be classified as an image of a bird and the second sample would be classified as not being an image of a bird.

The method then includes operating each classifier of the current level on the second training data to generate $1^{st}$ Fused data (S403). For example, FIG. 5 shows classifiers 301, 302, and 303 operating on second training data2 402 to generate $1^{st}$ Fused data1 450. The first classifier 301 analyzes each input sample of the second training data2 402 to determine a probability of that sample being part of the class. The first classifier 301 determined that sample3 has a 90% probability (see 0.9 under Feat5 in row with 'Sample3-1') of being part of the class. The probabilities output by the first classifier 301 are considered fifth features ('Feat5'). The second classifier 302 determined that sample3 has a 20% probability (see 0.2 under Feat6 in row with 'Sample3-1') of being part of the class (i.e., it is probably not part of the class). The probabilities output by the first classifier 302 are considered sixth features ('Feat6'). The third classifier 303 determined that sample3 has a 20% probability (see 0.2 under Feat7 in row with 'Sample3-1') of being part of the class (i.e., it is probably not part of the class). The probabilities output by the third classifier 303 are considered seventh features ('Feat7'). The first fused data1 450 is made by combining/concatenating the four features (Feat1-Feat4) of the second training data2 402 with the three probabilities (Feat5-Feat7) output by the three classifiers to generate the first fused data1 450 having seven total features (Feat1-Feat7). The probabilities may also be referred to as predictions.

The method then includes training each classifier of the current level on second training data (S404). For example, FIG. 6 shows the same classifiers 301-303 being trained on second training data2 402, which is the same data that the classifiers were operated on in FIG. 5.

The method then includes operating each classifier of the current level on the first training data to generate $2^{nd}$ Fused data (S405). For example, FIG. 6 shows classifiers 301-303 trained on second training data2 402 operating on first training data1 401 to generate second Fused data2 550. The first classifier 301 determined that sample2 has an 80% probability (see 0.8 under Feat5 in row with 'Sample1-1') of being part of the class. The second classifier 302 determined that sample2 has a 50% probability (see 0.5 under Feat6 in row with 'Sample1-1') of being part of the class. The third classifier 303 determined that sample2 has a 10% probability (see 0.1 under Feat7 in row with 'Sample1-1') of being part of the class (i.e., it is probably not part of the class). The second fused data2 550 is made by combining the four features (Feat1-Feat4) of the first training data1 401 with the three probabilities (Feat5-Feat7) output by the three classifiers to generate the second fused data1 550 having seven total features (Feat1-Feat7).

Figure 7:
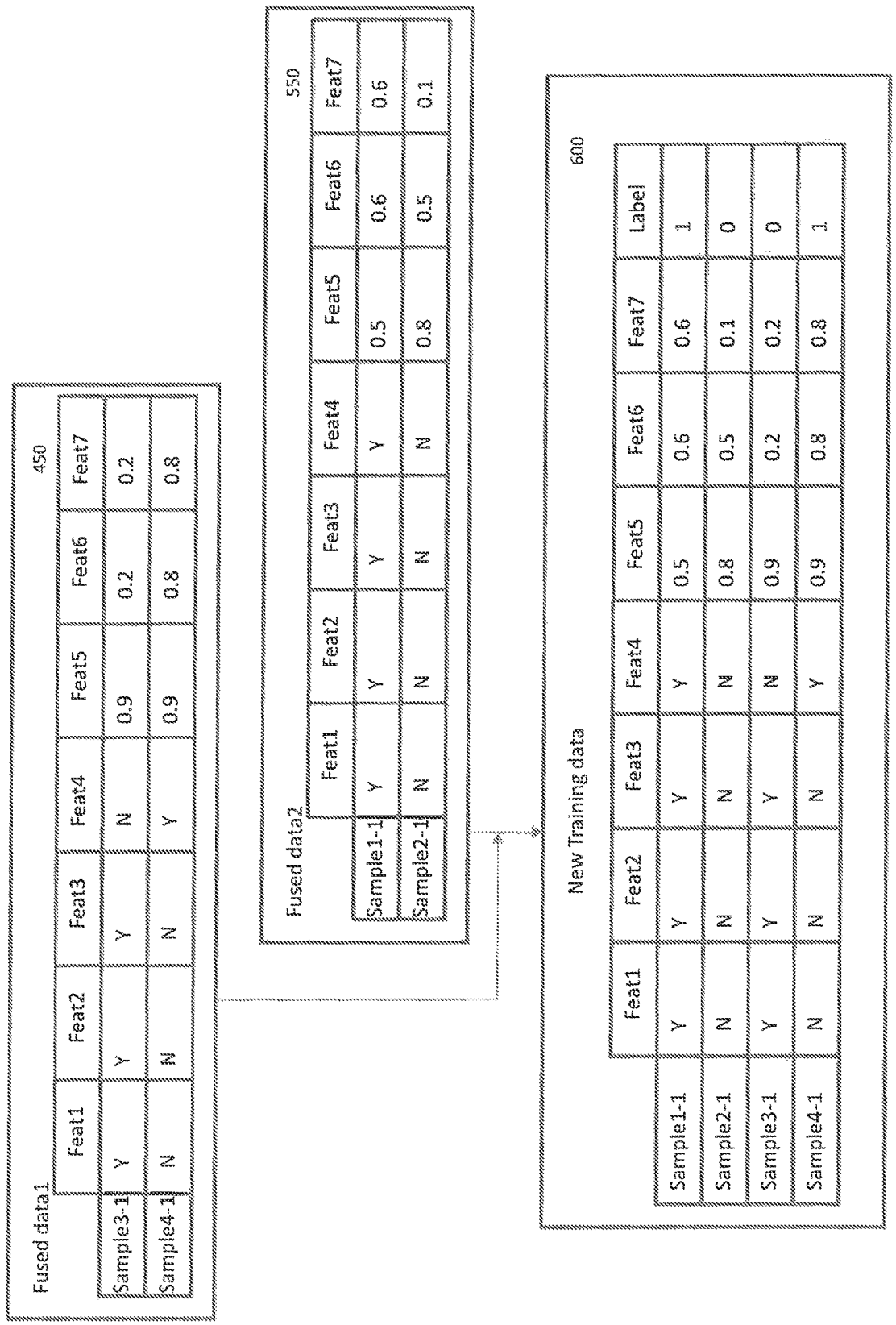

The method next includes combining the $1^{st}$ Fused data with the $2^{nd}$ fused data to generate new training data (S406). For example, FIG. 7 shows the combining of the first fused data1 with the second fused data2 to generate new training data 600. The samples of the first fused data1 450 are added to the samples of the second fused data2 550 to form the samples of the new training data 600. In addition, an analysis is performed on each sample with respect to the three probabilities to determine an overall classifying Label for the sample.

In an embodiment, the analysis determines the overall classifying Label from the majority of the feature probabilities of a given sample. For example, if the majority of probabilities (e.g., Feat5-Feat7) listed for a given sample are over 50%, the Label of the sample receives an indicator (1)

indicating it is part of the class, and otherwise receives an indicator (0) indicating it is not part of the class. For example, since two of the three probabilities of the first sample sample1-1 of the new training data 600 are above 50% (e.g., 60%), the sample receives a Label of 1. For example, since two of the three probabilities of the third sample sample3-1 of the new training data 600 are not above 50% (e.g., 20%), the sample receives a Label of 0. In another embodiment, the analysis averages the probabilities together to generate an overall probability and then the Label is set to indicate the sample is part of the class if the overall probability is above 50% and otherwise the Label is set to indicate the sample is not part of the class. In another embodiment, an adaptive boosting classifier (e.g., adaptive boosting, RankBoost, LPBoost, etc.) is used to combine the output of the classifiers (e.g., 301-30n) into a weighted sum that represents the final output of a boosted classifier. The weighted sum may be used to set the Label to indicate whether the sample is part of a given class or is not part of the given class.

Figure 8:
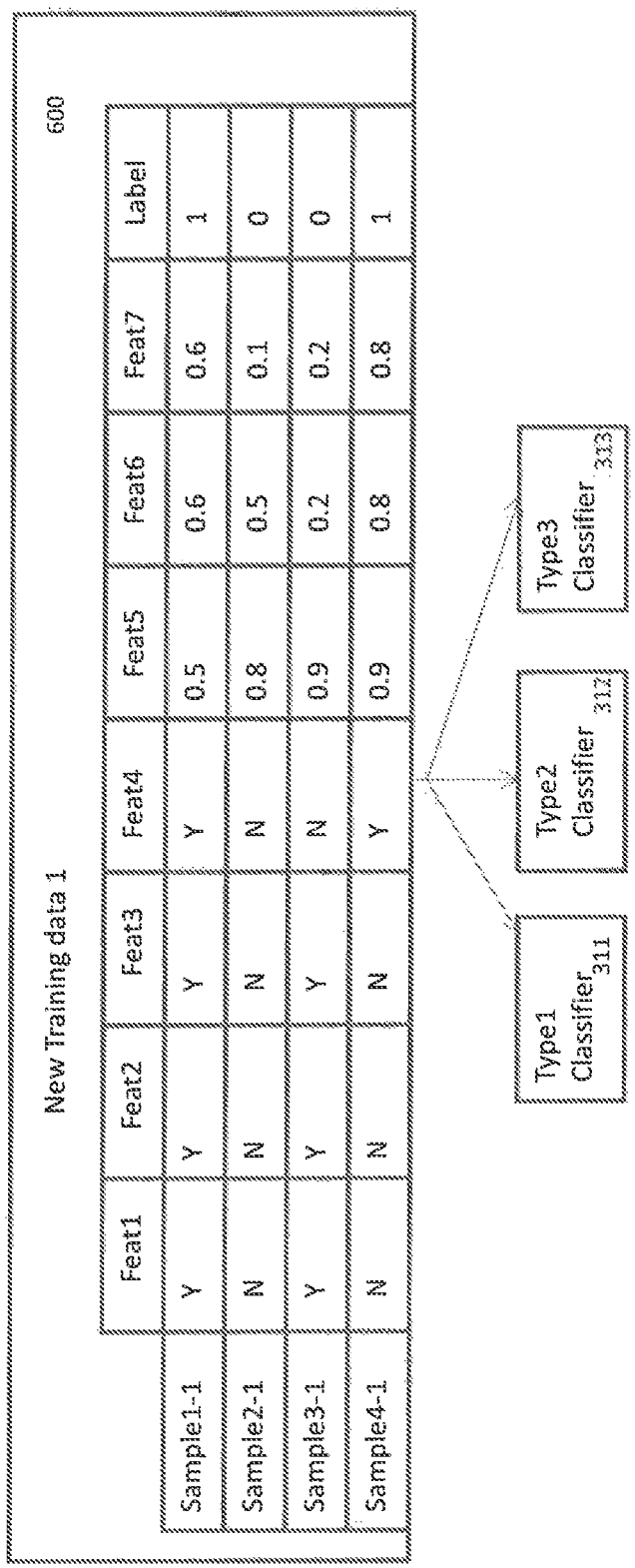

The method then includes determining whether it is time to perform the Final training (S407). A value stored in memory 28 may be set to indicate the desired number of layer or levels of the overall classifier. A counter may be incremented each time the new training data is generated and if it matches the value, then it is determined that the Final training is be performed. For example, if the counter is initially 0 and the value is set to 2, the counter would be incremented only to 1, and thus it would not be time to perform the Final training. Accordingly, the method would resume to step S401. However if the value was set to 1, since the counter would match, it would be time to perform the Final training. Thus, the method would train each classifier of the next layer or level on the newly generated training data so it can later being used to classify new data (S408). In an embodiment, prior to the training of the next layer, the predictive performance of each classifier of the previous layer is determined, the classifiers of the previous layer are ranked according to their respective predictive performances, and then a subset of these classifiers having a rank greater than a pre-defined ranking is chosen to be the classifiers of the next layer or level. For example, FIG. 8 shows that classifiers 311-313 are trained on the new training data 600. The final predictor 204 can operate the classifiers 311-313 on new data to output three probabilities, and analyze the three probabilities to determine whether the new data is part of the class or is not part of the class.

Embodiments of the invention result in an overall improvement in the field of machine learning. In certain implementations, the accuracy of prediction of a first layer of the classifiers (e.g., 301-30n) may be 11% percent higher than a conventional SVM classifier, 6% higher than a conventional Random Forrest classifier, and 3% higher than a conventional XGboost classifier. In certain implementations, the accuracy of prediction of a second layer of the classifiers (e.g., 311-31n) may be 13% percent higher than a conventional SVM classifier, 8% higher than a conventional Random Forrest classifier, and 5% higher than a conventional XGboost classifier.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating a predictor to classify data, the method comprising:
    training each of a plurality of first classifiers arranged in a first level on first data of current training data to output a probability indicating whether input data corresponds to a same given class, the first data comprising a first sample including a first feature vector indicating whether each of a plurality of features is present in the first sample, and a first label indicating whether the first sample corresponds to the same given class;
    operating each classifier of the first level on second data of the current training data to generate a plurality of predictions indicating first probabilities that a given sample of the second data of the current training data corresponds to the same given class, the operating including operating one of the first classifiers on a second sample of the second data including second feature vector indicating whether each of the features is present in the second sample;
    combining the current training data with the predictions to generate new training data; and
    training each of a plurality of second classifiers arranged in a second level on the new training data to output a probability indicating whether the input data corresponds to the same given class,
    wherein the first classifiers are classifiers of different classifier types, respectively and the second classifiers are classifiers of the different classifier types, respectively,
    wherein the combining comprises using a boosting classifier on the first probabilities to generate a first weighted sum, the new training data including a third sample comprising the second feature vector, a third feature vector comprising the first probabilities, and a second label determined from the first weighted sum, the second label indicating whether the third sample corresponds to the same given class.

2. The method of claim 1, wherein the current training data comprises a plurality of current samples.

3. The method of claim 2, wherein the combining comprises:
    for each current sample, concatenating the current sample with all the predictions generated from the corresponding current sample to generate new samples; and
    combining the new samples to generate the new training data.

4. The method of claim 3, wherein each current sample comprises a plurality of first feature indicators that indicate whether one of a plurality of first features is present in or absent from the corresponding current sample.

5. The method of claim 4, wherein the concatenating of the current sample with all the predictions comprises concatenating the first features indicators of the current sample with second feature indicators that correspond to the probabilities of the current sample.

6. The method of claim 3, further comprising: for each new sample, performing a calculation on the predictions of the corresponding new sample to set a classifier label of the corresponding new sample.

7. The method of claim 6, wherein the calculation sets the classifier label to indicate the new sample is part of the same given class when a majority of the predictions indicate the new sample is part of the same given class and otherwise sets the classifier label to indicate the new sample is not part of the same given class.

8. The method of claim 1, wherein the classifier types include support vector machine, neural network, and decision tree.

9. A computer system configured to generate a predictor to classify data, the system comprising:
    a memory storing a computer program; and
    a processor configured to execute the computer program, wherein the computer program is configured to train each of a plurality of first classifiers arranged in a first level on first data of current training data to output a probability indicating whether input data corresponds to a same given class, operate each classifier of the first level on second data of the current training data to generate a plurality of predictions indicating a first probabilities that a given sample of the current training data corresponds to the same given class, combine the current training data with the predictions to generate new training data, and train each of a plurality of second classifiers arranged in a second level on the new training data to output a probability indicating whether the input data corresponds to the same given class, wherein the first classifiers are classifiers of different classifier types, respectively and the second classifiers are classifiers of the different classifier types, respectively, the first data comprising a first sample including a first feature vector indicating whether each of a plurality of features is present in the first sample, and a first label indicating whether the first sample corresponds to the same given class, the operate including operating one of the first classifiers on a second sample of the second data including a second feature vector indicating whether each of the features is present in the second sample, and wherein the combine comprises using a boosting classifier on the first probabilities to generate a first weighted sum, the new training data including a third sample comprising the second feature vector, a third feature vector comprising the first probabilities, and a second label determined from the first weighted sum, the second label indicating whether the third sample corresponds to the same given class.

10. The computer system of claim 9, further comprising a database storing the current training data.

11. The computer system of claim 9, wherein the current training data comprises a plurality of current samples.

12. The computer system of claim 11, wherein the computer program combines the current training data with the predictions by concatenating, for each current sample, the current sample with all the predictions generated from the corresponding current sample to generate new samples, and combining the new samples to generate the new training data.

13. The computer system of claim 12, wherein each current sample comprises a plurality of first feature indicators that indicate whether one of a plurality of first features is present in or absent from the corresponding current sample.

14. The computer system of claim 13, wherein the concatenating comprises concatenating the first features indicators of the current sample with second feature indicators that correspond to the probabilities of the current sample.

15. A computer program product configured to generate a predictor to classify data, the program product comprising a computer readable storage medium having program instructions embodied therewith, the program instructions executable by a computer to perform a method comprising:

training each of a plurality of first classifiers arranged in a first level on first data of current training data to output a probability indicating whether input data corresponds to a same given class, the first data comprising a first sample including a first feature vector indicating whether each of a plurality of features is present in the first sample, and a first label indicating whether the first sample corresponds to the same given class;

operating each classifier of the first level on second data of the current training data to generate a plurality of predictions indicating first probabilities that a given sample of the current training data corresponds to the same given class, the operating including operating one of the first classifiers on a second sample of the second data including a second feature vector indicating whether each of the features is present in the second sample;

combining the current training data with the predictions to generate new training data; and training each of a plurality of second classifiers arranged in a second level on the new training data to output a probability indicating whether the input data corresponds to the same given class, wherein the first classifiers are classifiers of different classifier types, respectively and the second classifiers are classifiers of the different classifier types, respectively, wherein the combining comprises using a boosting classifier on the first probabilities to generate a first weighted sum, the new training data including a third sample comprising the second feature vector, a third feature vector comprising the first probabilities, and a second label determined from the first weighted sum, the second label indicating whether the third sample corresponds to the same given class.

16. The computer program product of claim 15, wherein the current training data comprises a plurality of current samples.

17. The computer program product of claim 16, wherein the combining comprises:
for each current sample, concatenating the current sample with all the predictions generated from the corresponding current sample to generate new samples; and
combining the new samples to generate the new training data.

18. The computer program product of claim 17, wherein each current sample comprises a plurality of first feature indicators that indicate whether one of a plurality of first features is present in or absent from the corresponding current sample.

19. A method of generating a predictor to classify data, the method comprising:

splitting current training data into first training data and second training data;

training each of a plurality of first classifiers arranged in a first level on the first training data to output a probability indicating whether input data corresponds to a same given class;

operating each of the first classifiers on the second training data to generate first fused data including a first sample of the second training data and a first probability output from each of the first classifiers indicating whether the first sample corresponds to the same given class;

training each classifier of the first level on the second training data to output a probability indicating whether input data corresponds to the same given class;

operating each of the first classifiers on the first training data mi training data and a second probability output from each of the first classifiers indicating whether the second sample corresponds to the same given class;

combining the first fused data with the second fused data to generate new training data; and training each of a plurality of second classifiers arranged in a second level on the new training data to output a probability indicating whether the input data corresponds to the same given class, wherein the first classifiers are classifiers of different classifier types, respectively and the second classifiers are classifiers of the different classifier types, respectively, wherein the combining comprises:
  using a boosting classifier on the first probabilities to generate a first weighted sum; and
  using the boosting classifier on the second probabilities to generate a second weighted sum,
  wherein the new training data includes a third sample including a first label determined from the first weighted sum, the first label indicating whether the third sample corresponds to the same given class, and
  wherein the new training data includes a fourth sample including a second label determined from the second weighted sum, the second label indicating whether the fourth sample corresponds to the same given class.

20. The method of claim 19, wherein the operating of the first classifiers on the second training data to generate first fused data comprises:
  operating the first classifiers on the second training data to generate first predictions;
  combining the second training data with the first predictions to generate the first fused data.

21. The method of claim 20, wherein the operating of each classifier of the first level on the first training data to generate second fused data comprises:
  operating the first classifiers on the first training data to generate second predictions;
  combining the first training data with the second predictions to generate the second fused data.

22. A computer program product configured to generate a predictor to classify data, the program product comprising a computer readable storage medium having program instructions embodied therewith, the program instructions executable by a computer to perform a method comprising:
  splitting current training data into first training data and second training data;
  training each of a plurality of first classifiers arranged in a first level on the first training data to output a probability indicating whether input data corresponds to a same given class;
  operating each of the first classifiers on the second training data to generate first fused data including a first sample of the second training data and a first probability output from each of the first classifiers indicating whether the first sample corresponds to the same given class;
  training each classifier of the first level on the second training data to output a probability indicating whether the input data corresponds to the same given class;
  operating each of the first classifiers on the first training data to generate second fused data including a second sample of the first training data and a second probability output from each of the first classifiers indicating whether the second sample corresponds to the same given class;
  combining the first fused data with the second fused data to generate new training data; and
  training each of a plurality of second classifiers arranged in a second level on the new training data,
  wherein the first classifiers are classifiers of different classifier types, respectively and the second classifiers are classifiers of the different classifier types, respectively,
  wherein the combining comprises:
    using a boosting classifier on the first probabilities to generate a first weighted sum; and
    using the boosting classifier on the second probabilities to generate a second weighted sum,
    wherein the new training data includes a third sample including a first label determined from the first weighted sum, the first label indicating whether the third sample corresponds to the same given class, and
    wherein the new training data includes a fourth sample including a second label determined from the second weighted sum, the second label indicating whether the fourth sample corresponds to the same given class.

23. The computer program product of claim 22, wherein the operating of first classifiers on the second training data to generate first fused data comprises:
  operating the first classifiers on the second training data to generate first predictions;
  combining the second training data with the first predictions to generate the first fused data.

24. The computer program product of claim 23, wherein the operating of each classifier of the first level on the first training data to generate second fused data comprises:
  operating the first classifiers on the first training data to generate second predictions;
  combining the first training data with the second predictions to generate the second fused data.

* * * * *